(12) United States Patent
Lee et al.

(10) Patent No.: US 6,430,473 B1
(45) Date of Patent: Aug. 6, 2002

(54) POWER ASSIST APPARATUS AND CONTROL METHOD FOR SAME

(75) Inventors: Hyoung-Ki Lee, Yongin-Si (KR); Hirohiko Arai; Kazuo Tanie, both of Ibaraki (JP)

(73) Assignee: Agency of Industrial Science & Technology, Ministry of International Trade & Industry, Tokyo (JP)

( * ) Notice: Subject to any disclaimer, the term of this patent is extended or adjusted under 35 U.S.C. 154(b) by 0 days.

(21) Appl. No.: 09/689,588

(22) Filed: Oct. 13, 2000

(30) Foreign Application Priority Data

Oct. 13, 1999 (JP) .......................................... 11-291012

(51) Int. Cl.[7] .............................................. G06F 19/00
(52) U.S. Cl. ...................... 700/245; 700/258; 700/253; 700/254; 700/260; 700/261; 318/568.16; 318/568.22; 318/574; 318/577; 318/587; 901/15; 901/17; 901/34; 701/50
(58) Field of Search ................................ 700/245, 253, 700/254, 258, 260, 261; 318/568.16, 568.22, 574, 577, 587; 901/15, 17, 34; 701/50; 600/437

(56) References Cited

U.S. PATENT DOCUMENTS

| | | | | |
|---|---|---|---|---|
| 5,080,000 A | * | 1/1992 | Bubic | 318/301 |
| 5,100,278 A | * | 3/1992 | Westlake | 209/668 |
| 5,300,869 A | * | 4/1994 | Skaar et al. | 318/587 |
| 5,908,458 A | * | 6/1999 | Rowe et al. | 600/437 |
| 6,058,344 A | * | 5/2000 | Rowe et al. | 701/50 |
| 6,194,680 B1 | * | 2/2001 | Seelinger et al. | 318/587 |
| 6,212,748 B1 | * | 4/2001 | Porter et al. | 209/565 |
| 6,277,030 B1 | * | 8/2001 | Baynton et al. | 198/345.2 |

OTHER PUBLICATIONS

Law et al., A process for fabricating high current circuits with high interconnect density, 1994, IEEE, pp.: 363–365 vol.1.*

Beuret et al., Microfabrication of 3D multidirectional inclined structures by UV lithography and electroplating, 1994, IEEE, pp.: 81–85.*

* cited by examiner

Primary Examiner—William A. Cuchlinski, Jr.
Assistant Examiner—McDieunel Marc
(74) Attorney, Agent, or Firm—Oblon, Spivak, McClelland, Maier & Neustadt, P.C.

(57) ABSTRACT

A power assist apparatus includes an autonomously mobile base on which a manipulator for holding a load is mounted. The movement of the mobile base is controlled such that when the manipulator tip is within a prescribed operating region relative to the mobile base, the mobile base is maintained stationary, but when the manipulator tip moves outside the operating region, the mobile base is moved to decrease the distance between the mobile base and the manipulator tip. The power assist apparatus assists with the carrying of loads by amplifying an operational force applied to the manipulator.

10 Claims, 5 Drawing Sheets

POWER ASSIST APPARATUS AND CONTROL METHOD FOR SAME

BACKGROUND OF THE INVENTION

Field of the Invention

The present invention relates to a power assist apparatus that includes a manipulator that holds loads at its tip and a mobile base on which the manipulator is mounted, which assists human operators to carry loads by amplifying an operational force applied to the manipulator, and to a method of controlling the power assist apparatus.

Research into power assist methods in which humans and robots cooperate to carry loads has been carried out in the U.S., at the University of California, and in Japan, at Tohoku University, the Mechanical Engineering Laboratory, and elsewhere. These methods involve using two force sensors to sense a load being manipulated at the tip of a robot manipulator, and an operational force applied by an operator. An operational force applied to the manipulator by the operator is amplified and applied to the load, making it easier for the human operator to move the load.

If the base of the manipulator is supported on a fixed base, loads can only be handled within the range of the robot arm movement. Mounting the manipulator on a mobile base increases the range over which the manipulator can be used to handle loads. However, when the manipulator is mounted on a mobile base, it becomes necessary to use a method of cooperatively controlling the manipulator and the mobile base to maintain the stability of the base. When the manipulator is mounted on the mobile base, there is a risk that some manipulator positions and loads may cause the base to fall over. To avoid this, the tip position of the manipulator relative to the base must be controlled.

In one prior art for cooperative control method, a system that combines the mobile base and manipulator is controlled as a redundant system in which the position of the mobile base is constantly adjusted in accordance with manipulator operations. However, the base with the manipulator weighs a considerable amount, and having such a heavy machine constantly moving around in the vicinity of humans during work operations is undesirable from the standpoint of safety. Moreover, this continuous movement also consumes much energy, and also reduces the response speed off the manipulator.

In view of the above circumstances, an object of the present invention is to provide a power assist apparatus that is safe during work operation, keeps down energy consumption and provides improved manipulator response speed, and a control method for controlling the apparatus.

SUMMARY OF THE INVENTION

To attain the above object, the present invention provides a power assist apparatus comprising: a manipulator that holds a load at its tip; an autonomously mobile base on which the manipulator is mounted; and control means that, when the manipulator tip is within a prescribed operating region relative to the mobile base, maintains the mobile base in a stationary state, and when the manipulator tip moves outside said operating region, moves the mobile to decrease distance between the mobile base and the manipulator tip; said power assist apparatus assisting with carrying of loads by amplifying an operational force applied to the manipulator.

The above power assist apparatus further comprises the of resistance imparting means that, when the tip of the manipulator is within a prescribed peripheral region in proximity to a perimeter within the operating region, operates the manipulator with a resistance force applied to an applied operational force.

It is preferable that the resistance force imparting means operates the manipulator with a resistance force that is gradually increased as the tip of the manipulator moves further toward the outer perimeter of the peripheral region provided in the operating region. More preferably, the resistance force applied by the resistance imparting means increases in accordance with a non-linear spring coefficient. When the mobile base is autonomously mobile, it is preferable for the manipulator to be operated so that the resistance force is gradually reduced as the distance separating the manipulator tip and the mobile base decreases and, when the distance between the mobile base and the manipulator tip has reached a prescribed initial state, for the resistance force to be at zero.

The object is also attained by a control method for controlling a power assist apparatus that comprises a manipulator that at a tip thereof holds loads to be moved and an autonomously mobile base on which the manipulator is mounted and assists with handling of loads by amplifying an operational force applied to the manipulator, said method comprising: maintaining the mobile case in a stationary state when the manipulator tip is within a prescribed operating region relative to the mobile base; and moving the mobile base to decrease a distance between the mobile base and the manipulator tip when the manipulator tip moves outside said operating region.

In accordance with the control method, when the tip of the manipulator is within a prescribed peripheral region in proximity to a perimeter within the operating region, the manipulator is operated with a resistance force being applied to an applied operational force.

Moreover, it is preferable that the resistance force imparting means operates the manipulator such that the resistance force is gradually increased as the manipulator moves toward the outer perimeter within the peripheral region provided in the operating region. More preferably the resistance force applied by the resistance imparting means increases in accordance with a non-linear spring coefficient. When the mobile base is autonomously mobile it is preferable for the manipulator to be operated so that the resistance force is gradually reduced as the distance separating the manipulator tip and the mobile base decreases and, when the distance between the mobile base and the manipulator tip has reached a prescribed initial state, for the resistance force to be at zero.

Thus, in accordance with this invention, as described above, the mobile base is moved only when the tip of the manipulator reaches the outer periphery of the operating region, which, in addition to being advantageous in terms of safety, is also advantageous in terms of energy consumption and the response characteristics of the manipulator. Furthermore, when the mobile base is autonomously mobile, the frequency of mobile base movements can be decreased by retracting the manipulator tip to its initial position enhancing the above effects.

Further features of the invention, its nature and various advantages will be more apparent from the accompanying drawings and following detailed description of the invention.

BRIEF DESCRIPTION OF THE DRAWINGS

FIG. 3 (b) is a graph showing the relationship between the position of the manipulator tip and the resistance force added to the operational force.

FIG. 4 is a general view of the power assist apparatus of the present invention. This power assist apparatus 1, which is for providing power assistance to carry a workload W, includes a manipulator 10 and a mobile base 20 on which the manipulator 10 is mounted. The manipulator 10 is a multi-jointed arm having a plurality of pivot joints 11a, 11b, 11c . . . that enable the manipulator to be extended and shortened. The tip of the manipulator 10 is provided with a hand 12 and a control lever 13. The hand 12 is for holding a workload W at the tip , and is provided associated from the tip of the manipulator 10 back along the direction of the axis thereof. The control lever 13, which transmits the operator's operational force to the manipulator 10, extends sideways from the manipulator tip. A load force sensor 14 is provided between the manipulator tip and the hand 12, and an operational force sensor 15 is provided between tip and the control lever 13. The joints are provided with respective angle sensors 16a, 16b, 16c.

The mobile base 20 holds the base and of the manipulator 10. The mobile base 20 has a plurality of wheels 21 that allows it to move over a floor. As shown in FIG. 1, the power assist apparatus 1 includes an impedance control section 30. Based on the operational force $F_h$ detected by the operational force sensor 15, load $F_L$ imposed by the workload W being carried detected by the load force sensor 14, and the position $X_m$ of the manipulator 10 relative to the mobile base 20 computed based on the angles detected by the angle sensors 16a, 16b, 16c, the impedance control section 30 applies target velocity signals to servos 10' and 20' to control the operation of the manipulator 10 and mobile base 20, and corresponds to the control means and means for imparting the resistance force.

As shown in FIG. 3, the operating region within which the tip of the manipulator 10 can operate, using the mobile base 20 as the reference point, is divided into a safety region and a warning region. The safety region is a region in which the manipulator 10 can be used in a relatively stable state with little change in the center of gravity of the power assist apparatus 1. This region extends out, to a distance $L_m$ from $X_b$ as the reference, or base, point formed by the mobile base 20. The warning region is located on the periphery of the safety region, and is set to extend out a distance $L_d$ from $X_b$. This distance $L_s$ can be set to be the same as the distance to the outer edge of the operating region within which the tip of the manipulator 10 can operate, or it can be set to a position within the outer edge of the operating region.

Figure 3A:
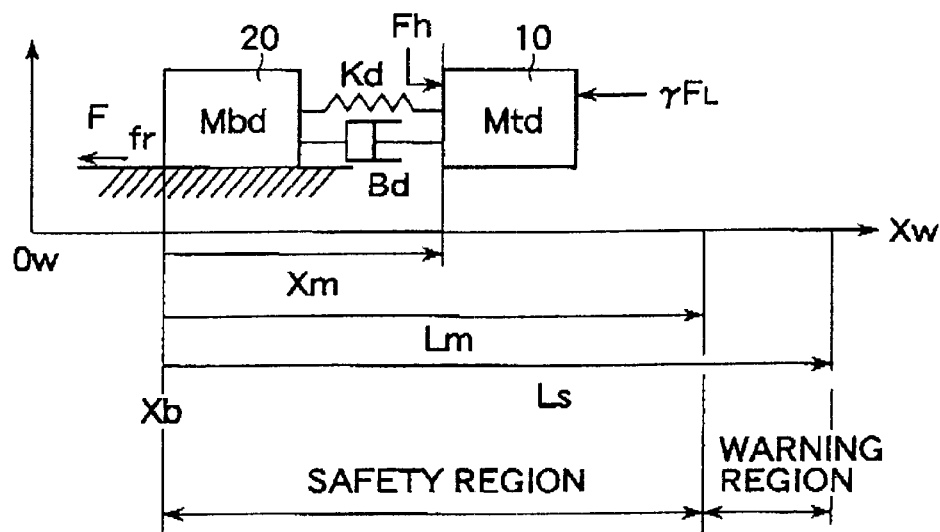
FIG. 3 (a) is a diagram of a virtual inertia, viscosity and spring model applied to the power assist apparatus.
Figure 3B:
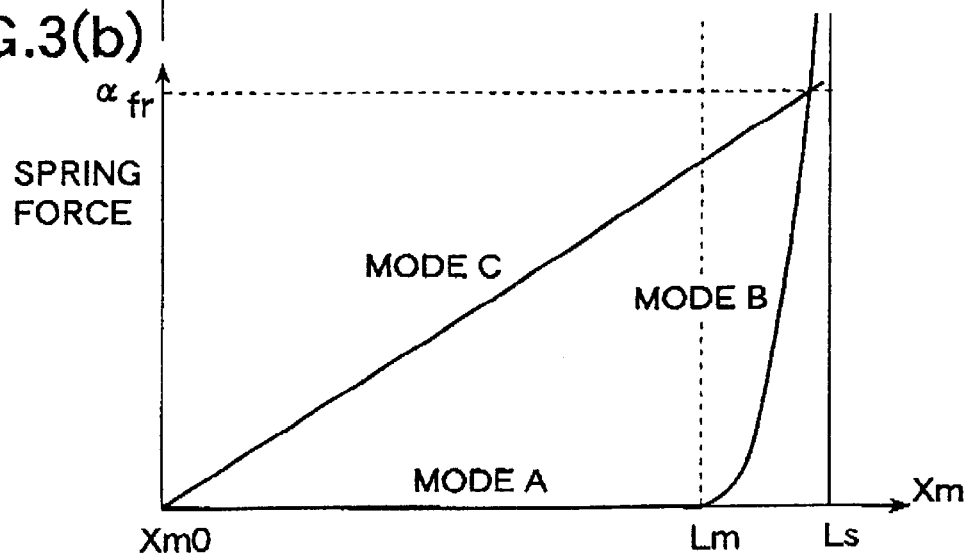
Figure 4:
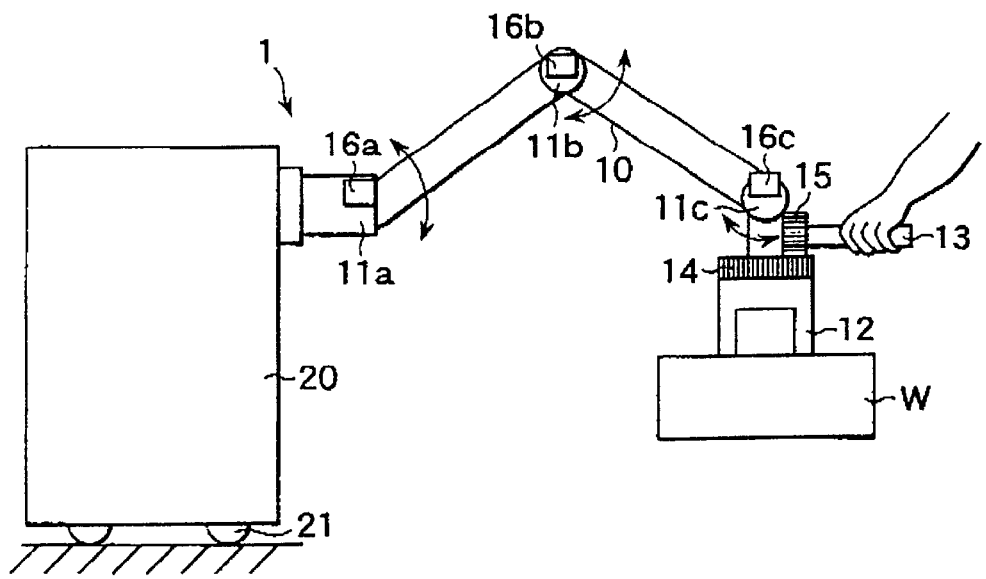
FIG. 4 is a concept diagram showing the general structure of the power assist apparatus of this invention.

The impedance control section 30 has three preset operating control modes. The first mode (hereinafter referred to as "mode A") is the normal power assist mode used with the mobile base 20 stationary. Thus, if the assist ratio is $\gamma(0<\gamma<1)$, in mode A the manipulator 10 is controlled to achieve a match between operational force $F_h$ and $-\gamma \cdot F_L$. In the second mode ("mode B"), as shown in FIG. 3 (b), with the mobile base 20 stationary, with respect to $F_h$, control is effected for the addition, as a high-order function, of resistance force in accordance with a non-linear spring coefficient. Thus, in mode B, if $K_d(X_m)$ is non-linear spring coefficient and $X_{m0}$ is distance from the mobile base 20 when the tip of the manipulator 10 is at the initial position, then the manipulator 10 is controlled so that $F_h$ matches $-\gamma \cdot F_L + K_d(X_m) \cdot (X_m - X_{m0})$. This is the mode in which the mobile base 20 is controlled to bring the tip of the manipulator 10 to the initial position, meaning distance to the tip is $X_{m0}$. In this case, as shown in FIG. 3 (b), with respect to operational force $F_h$, control is modified to add resistance force in accordance with a linear spring coefficient proportional to the deviation the manipulator 10 tip and the mobile base 20 $(X_m - X_{m0})$.

With respect to the three operating control modes, examples of specific control laws will now be explained with reference to the virtual inertia, viscosity and spring model shown in FIG. 3 (a). In FIG. 3 (a), virtual inertia $M_{td}$ is set for the manipulator 10 tip, virtual inertia $M_{bd}$ is set for the mobile base 20, and virtual viscous friction $B_d$ between the manipulator 10 tip and the mobile base 20 is set. With respect to mode A, impedance control laws ① shown in equation (1) is applied.

$$F_h + \gamma \cdot F_L = M_{td} \cdot \ddot{X}_m + B_d \cdot \dot{X}_m \tag{1}$$

In made A, when $X_m$ is in a statically determinate state, there is a match between $F_h$ and $-\gamma \cdot F_L$, resulting in a power assist effect being applied to the workload W that is $1/\gamma$ times $F_h$. In this case, the target velocity signal applied to the tip of the manipulator 10 can be obtained by integrating the acceleration given by equation (2).

$$\ddot{X}_m = (F_h + \gamma \cdot F_L - B_d \cdot \dot{X}_m)/M_{td} \tag{2}$$

In mode A, the mobile base 20 is maintained in a stationary state, satisfying equation (3)

$$\dot{X}_b = 0 \tag{3}$$

In mode 8, the impedance control laws ② shown by equation (4) is applied.

$$F_h + \gamma \cdot F_L = M_{td} \cdot \ddot{X}_m + B_d \cdot \dot{X}_m + K_d(X_m) \cdot (X_m - X_{m0}) \tag{4}$$

In mode B, to the operational force $F_h$ applied to the manipulator 10 is added the resistance force $K_d(X_m) \cdot (X_m - X_{m0})$ from the non-linear spring effect in the case of mode A. In this case, the target velocity signal applied to the tip of the manipulator 10 can be obtained by integrating the acceleration given by equation (5).

$$\ddot{X}_m = \{F_h + \gamma \cdot F_L - B_d \cdot \dot{X}_m - K_d(X_m) \cdot (X_m - X_{m0})\}/M_{td} \tag{5}$$

In mode B, the mobile base 20 is maintained in a stationary state, satisfying equation (3).

In mode B, the impedance control laws ③ shown by equation (6) is applied.

$$F_h + \gamma \cdot F_L = M_{td} \cdot \ddot{X}_m + (M_{td} \cdot B_d/M_{bd} + B_d) \cdot \dot{X}_m + (M_{td} \cdot K_d/M_{bd} + K_d) \cdot (X_m - X_{m0}) \tag{6}$$

In mode C, the operational force $F_h$ applied to the manipulator 10 is a value obtained by adding a linear spring force $(M_{td} \cdot K_d/M_{bd} + K_d) \cdot (X_m - X_{m0})$ proportional to the deviation $(x_m - x_{m0})$ between the manipulator 10 tip and the mobile base 20. In this case, the tar get velocity signal applied to the tin of the manipulator 10 can be obtained by integrating the acceleration given by equation (7).

$$\ddot{X}_m = \{F_h + \gamma \cdot F_L - (M_{td} \cdot B_d/M_{bd} + B_d) \cdot \dot{X}_m - (M_{td} \cdot K_d/M_{bd} + K_d) \cdot (X_m - X_{m0})\}/M_{td} \quad (7)$$

In mode C, the control laws shown in equation (8) is applied to the mobile base 20 to obtain the same behavior as mass $M_{bd}$ that receives a spring force proportional to the deviation $(X_m - X_{m0})$ between the manipulator 10 tip and the mobile base 20.

$$M_{bd} \cdot \ddot{X}_b = B_d \cdot \dot{X}_m + K_d \cdot (X_m - X_{m0}) \quad (8)$$

In this case, the target velocity signal applied to the tip of the manipulator 10 can be obtained by integrating the acceleration given by equation (9).

$$\ddot{X}_b = \{B_d \cdot \dot{X}_m + K_d \cdot (X_m - X_{m0})\}/M_{bd} \quad (9)$$

Figure 1:
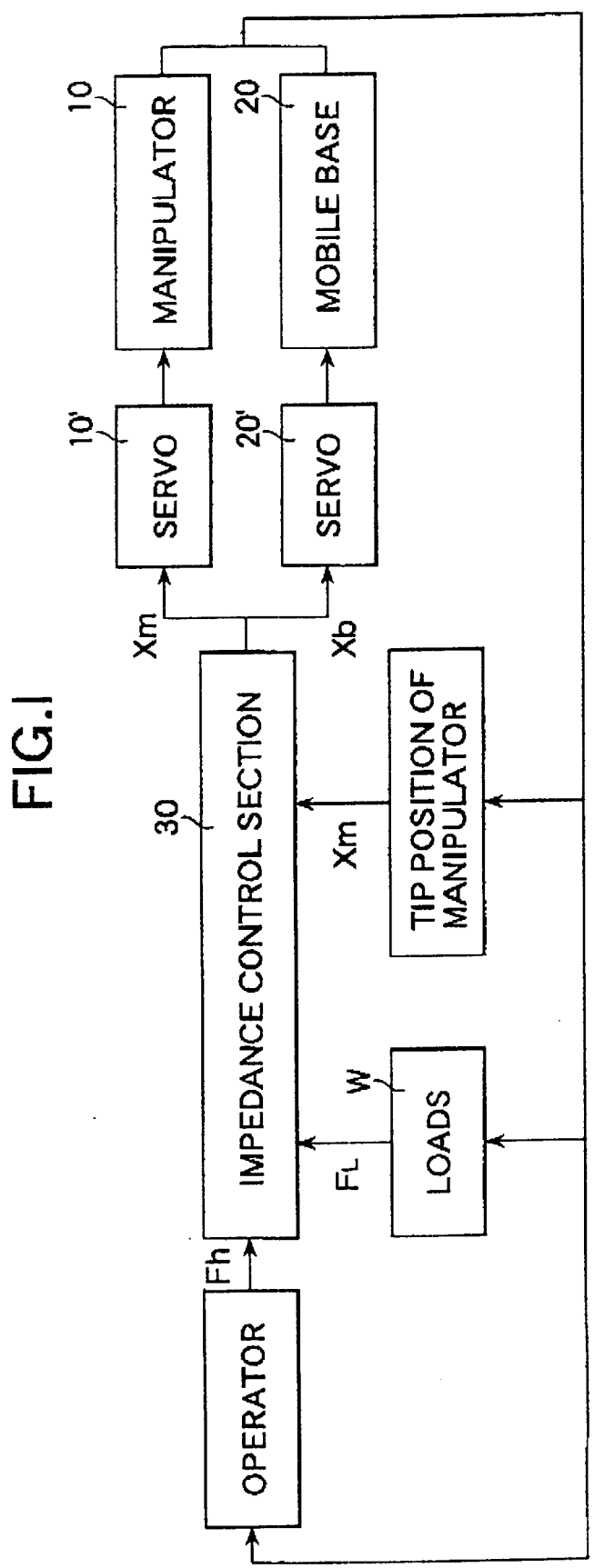
FIG. 1 is a block diagram showing the control system of the power assist apparatus of the present invention.
Figure 2:
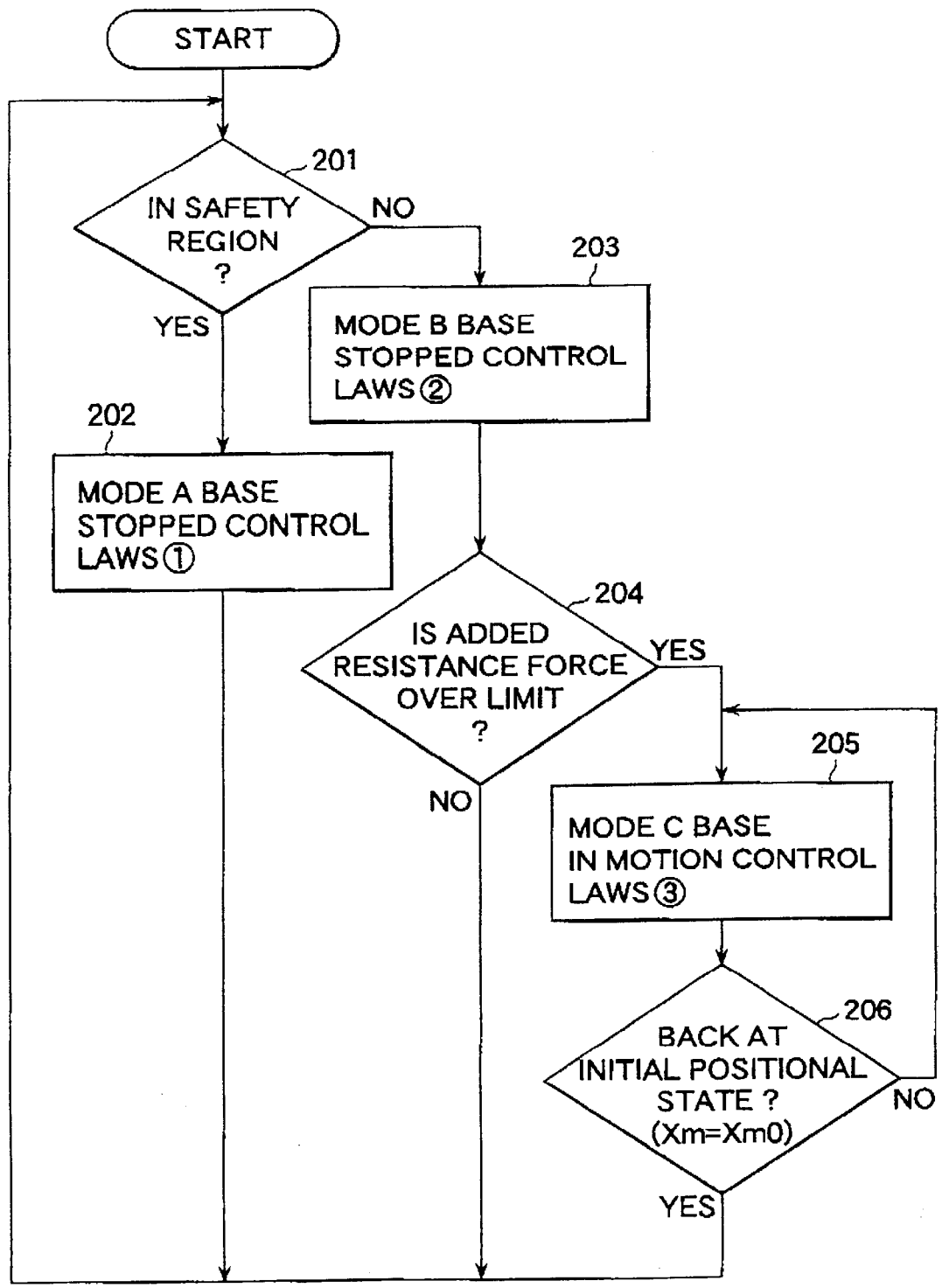
FIG. 2 is a flow chart showing the processing sequence of the impedance control section.

The operation of the impedance control section 30 will now be explained with reference to FIG. 2. When the power assist apparatus 1 is driven, the impedance control section 30 constantly monitors how far the tip of the manipulator 10 is from the mobile base 20 (step 201) When the tip of the manipulator 10 is in the safety region ($0 \leq X_m < L_m$), the impedance control section 30 selects mode A, and with the base halted, controls the manipulator 10 so that operational force $F_h$ matches $-\gamma \cdot F_L$ (step 202). As a result, the operator's operational force $F_h$ is applied to the workload W multiplied by $1/\gamma$, enabling the operator to move the workload W with less effort.

When from the above state the tip of the manipulator 10 is moved outwards, entering the warning region ($L_m \leq X_m < L_s$), the impedance control section 30 moves from step 201 to step 203 and selects mode B. This results in the imposition of a resistance force on the operator's operational force $F_h$. This resistance force enables the operator to realize that the tip of the manipulator 10 has moved out of the safety region. Accordingly, the operator can then use the control lever 13 to bring the tip of the manipulator 10 back into the safety region. Thus, this use of a resistance force makes the operator aware of the position of the tip in a more natural way than warning lights or sounds, and therefore improves the operability of the power assist apparatus 1.

Moreover, in accordance with this power assist apparatus 1, as the tip moves further out towards the outer boundary of the warning region, the resistance force applied to the operator gradually increases, indicating to the operator how for the tip has moved outside the safety region. In a number of ways, this is better than always applying the same large resistance force whenever the tip moves out of the safety region. For example, it facilitates control, and reduces the impact force on the various parts of the manipulator 10. In addition, the increase of the above resistance force is implemented as a high-order function, resulting in a smooth transition to the application of the resistance force. Compared to a configuration in which the resistance force is increased linearly, this allows a resistance force of the same magnitude to be attained in a shorter distance, enabling a smaller warning region to be used.

In mode 8 control, when the manipulator 10 tip is in the warning region, the resistance force applied to the operational force continues to increase until it exceeds a preset limit value (step 204). If during this period the tip returns to the safety region, the process moves from step 201 to step 202, and mode A control is again implemented. If in mode B the manipulator 10 tip reaches the outer boundary of the warning region and the resistance force applied to the operator exceeds preset limit value $\alpha_{fr}$, that is, $K_d(X_m) \cdot (X_m - X_{m0}) \geq \alpha_{fr}$, the process moves from step 204 to step 205 and the impedance control section 30 selects mode C. Mode C control will continue to be implemented until the distance to the manipulator tip is $X_{m0}$ (step 206).

As a result, the mobile base 20 moves to bring the manipulator tip back to the initial position. In this case, $F_h$, the resistance force applied to the operational force is decreased linearly until there is zero deviation ($K_m - X_{m0}$) between the manipulator tip and the mobile base 20. Thus, the resistance force is used to indicate to the operator whether or not the manipulator tip has returned to its initial state.

Figure 5:
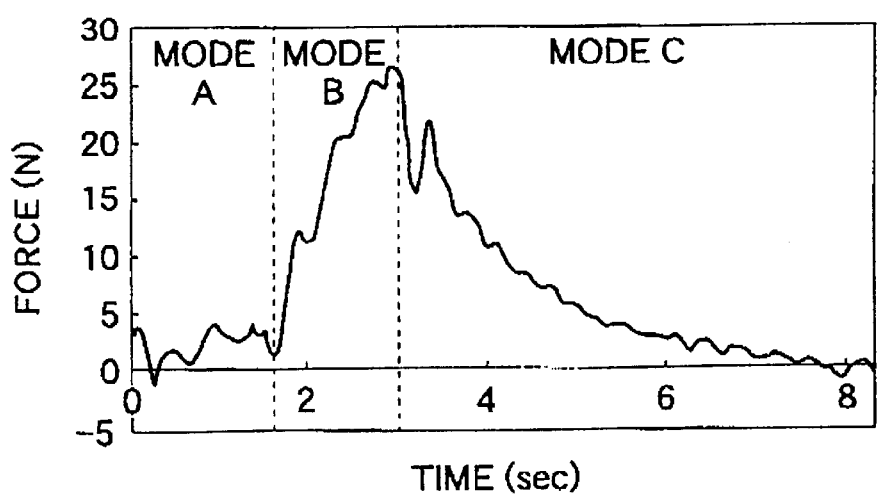
FIG. 5 is a graph showing changes in the operational force to which the resistance force has been added, relative to the position of the manipulator tip.
Figure 6:
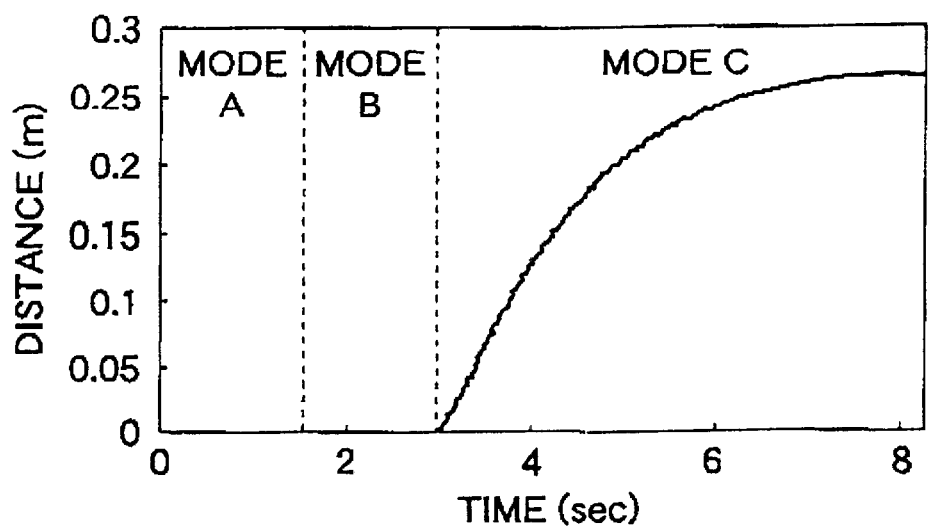
FIG. 6 is a graph showing changes in the position of the mobile base relative to the position of the manipulator tip.
Figure 7:
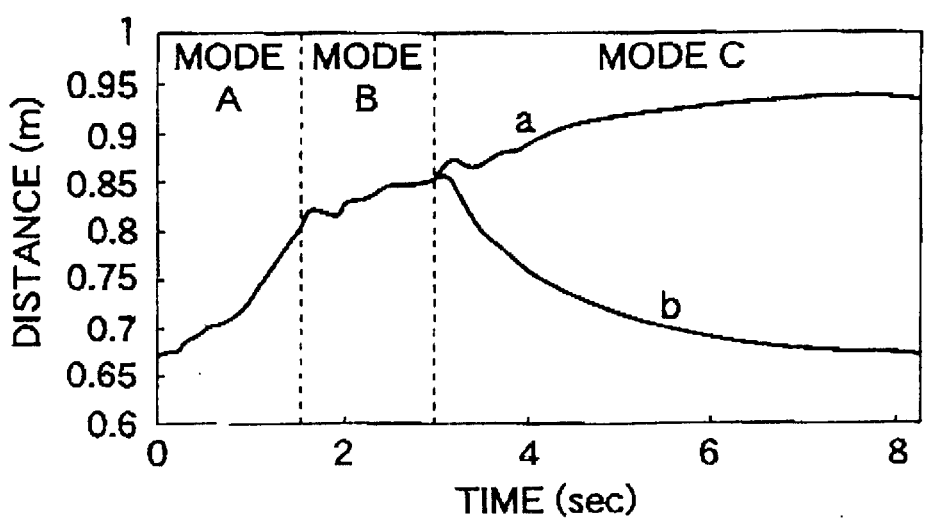
FIG. 7 is a graph that is a plot of changes in the position of the manipulator tip.

After the manipulator tip has been returned to it's initial state under mode C control, mode A is again selected and the above operation is repeated. FIGS. 5 to 7 are graphs showing control test results obtained with respect the power assist apparatus 1. Specifically, FIG. 5 shows how the operational force, with the addition of the resistance force, changes with respect to the position of the manipulator tip. The operational force applied to the manipulator by the operator changes as expected in the three modes. FIG. 6 shows changes in the position of the mobile base with respect to the position of the manipulator tip. The mobile base 20 is stationary in modes A and B, and first moves in mode C. FIG. 7 is a plot of changes in the position of the manipulator tip (a signifying the absolute position and b the relative position of the mobile base) returned to the initial position under the control of mode C.

As described in the foregoing, in accordance with the power assist apparatus 1, the mobile base 20 only moves when the tip of the manipulator 10 reaches the outside perimeter of the warning region. This is safer than when a mobile base constantly moves about, as in the prior art, and is also advantageous in terms of energy consumption and manipulator response characteristics. Moreover, when the mobile base 20 does move, the tip of the manipulator 10 is retracted to its initial position. This makes it possible to reduce the frequency of movements by the mobile base 20, further enhancing the above affects. Also, applying a resistance force to the operational force makes it possible for the operator to know whether the mobile base 20 has started moving.

Although the above embodiment has been explained with reference to a power assist apparatus equipped with a multi-jointed manipulator arm, it is to be understood that other types of manipulator arm may be used. In such cases, the means used to detect the position of the manipulator tip need not be an angle sensor, but may be a means suited to the type of manipulator employed.

Moreover, in the above embodiment, when the manipulator tip is in the warning region a resistance force is applied to the operational force exerted by the operator, with the resistance force being increased in accordance with a non-linear spring coefficient as the tip moves further outwards. However, the invention is not limited to this configuration. For example, when the tip leaves the safety region, a large resistance force can be applied in one go, and increased in accordance with a linear spring coefficient as the tip moves further outward. Also, warning lights and/or sounds can be used instead of, or in conjunction with, resistance force, to indicate to the operator that the tip has moved out of the safety region.

In the case of the above embodiment, when the mobile base moves, the tip of the manipulator is retracted to the initial position. Instead, however, a configuration can be used that stops the mobile base when the manipulator tip has returned to the safety region. Similarly, the invention is not limited to the above arrangement in which, while the mobile base is moving, the operational force applied by the operator is subjected to a resistance force in accordance with a linear spring coefficient. Instead, a resistance force can be applied that is based on a nonlinear spring coefficient, or no resistance force applied at all.

In accordance with the foregoing explanation, the mobile base is moved only where the of the manipulator move to the outer periphery of the operating region, which compared to the prior art systems in which the mobile base is constantly moving, is safer, uses less energy and is also more advantageous in terms of the response characteristics of the manipulator. Moreover, when the mobile base is autonomously mobile, the frequency of mobile base's movements can be decreased by retracting the manipulator tip to its initial position, further enhancing the above effects.

Also, applying a resistance force to the operational force makes it possible to indicate to the operator the location of the manipulator tip in the operating region. This effect is enhanced by gradually increasing the resistance force as the tip moves further outwards. And, since the increase in the resistance force is implemented in accordance with a non-linear spring coefficient, the transition between non-application and application of the resistance force feel smooth and natural.

What is claimed is:

1. A power assist apparatus comprising:
a manipulator that holds a load at a tip thereof; an autonomously mobile base on which the manipulator is mounted; and control means that, when the manipulator tip is within a prescribed operating region relative to the mobile base, maintains the mobile base in a stationary state, and when the manipulator tip moves outside said operating region, moves the mobile base to decrease distance between the mobile base and the manipulator tip; said power assist apparatus assisting with carrying of loads by amplifying an operational force applied to the manipulator.

2. A power assist apparatus according to claim 1, that further includes resistance force imparting means that, when the tip of the manipulator is within a prescribed peripheral region in proximity to a perimeter within the operating region, operates the manipulator with a resistance force being applied to an applied operational force.

3. A power assist apparatus according to claim 2, the resistance force imparting means operates the manipulator with the resistance force being gradually increased as the tip of the manipulator moves further outwards within the peripheral region provided in the operating region.

4. A power assist apparatus according to claim 3, wherein the resistance force applied by the resistance imparting means increases in accordance with a non-linear spring coefficient.

5. A power assist apparatus according to claim 2, wherein when the mobile base is autonomously mobile, the resistance imparting means operates the manipulator with a resistance force that is gradually reduced as a distance separating the manipulator tip and the mobile base decreases and, when the distance between the mobile base and the manipulator tip has reached a prescribed initial distance, there is zero resistance force.

6. A control method for controlling a power assist apparatus chat comprises a manipulator that at a tip thereof holds loads to be moved and an autonomously mobile base on which the manipulator is mounted and assists with handling of loads by amplifying an operational force applied to the manipulator, said method comprising:
maintaining the mobile base in a stationary state when the manipulator tip is within a prescribed operating region relative to the mobile base;
moving the mobile base to decrease a distance between the mobile base and the manipulator tip when the manipulator tip moves outside said operating region.

7. A control method according to claims 6, wherein when the tip of the manipulator is within a prescribed peripheral region in proximity to a perimeter within the operating region, operates the manipulator with a resistance force applied to an applied operational force.

8. A control method according to claim 7, wherein the manipulator is operated with a resistance force that is gradually increased as the tip of the manipulator moves further outwards within the peripheral region provided in the operating region.

9. A control method according to claim 8, wherein the resistance force increases in accordance with a nonlinear spring coefficient.

10. A control method according to claim 7, wherein when the mobile base is autonomously mobile, the manipulator is operated with a resistance force applied by the resistance imparting means that is gradually reduced as a distance separating the manipulator tip and the mobile base decreases and, when the distance between the mobile base and the manipulator tip has reached a prescribed initial distance, there is zero resistance force.

* * * * *